Dec. 23, 1969    R. O. DUNN ET AL    3,486,068
EMERGENCY LIGHTING SYSTEM EMPLOYING DUAL
FILAMENT LAMPS AND CHANGEOVER RELAYS
Original Filed July 19, 1967
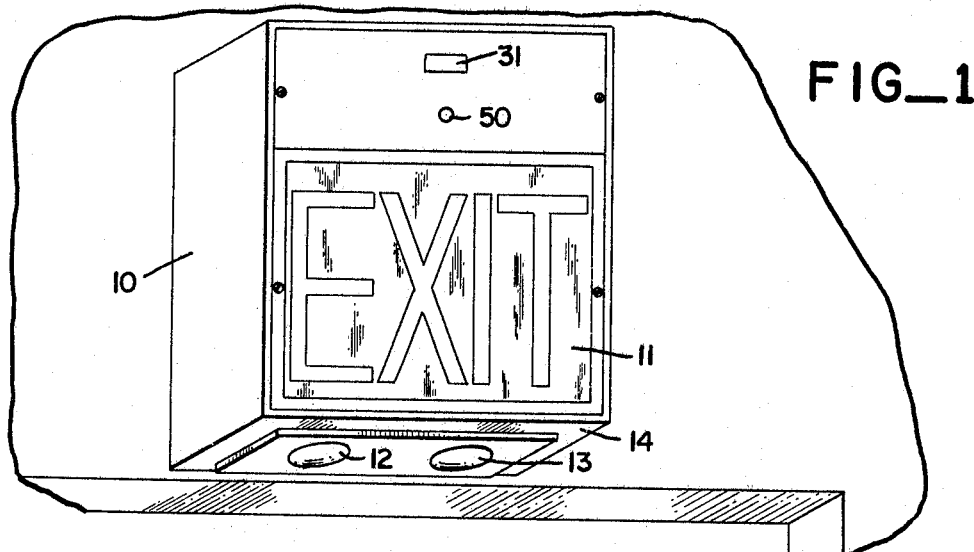
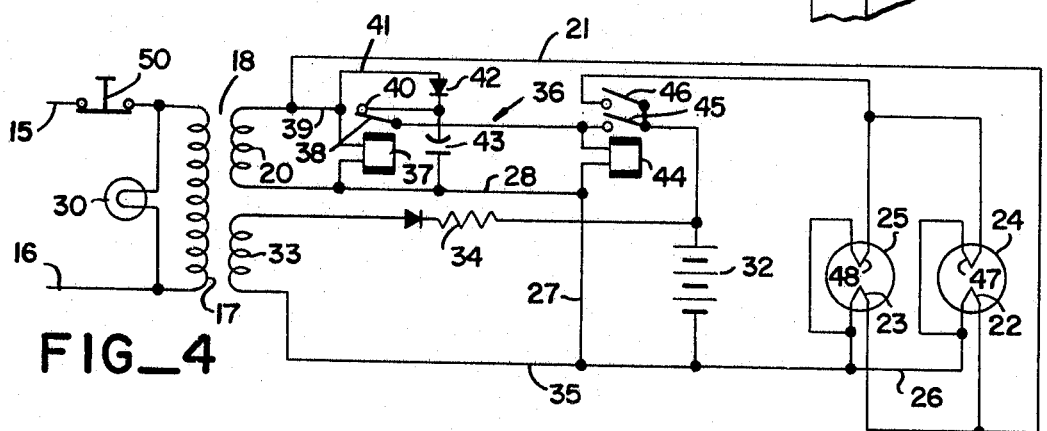
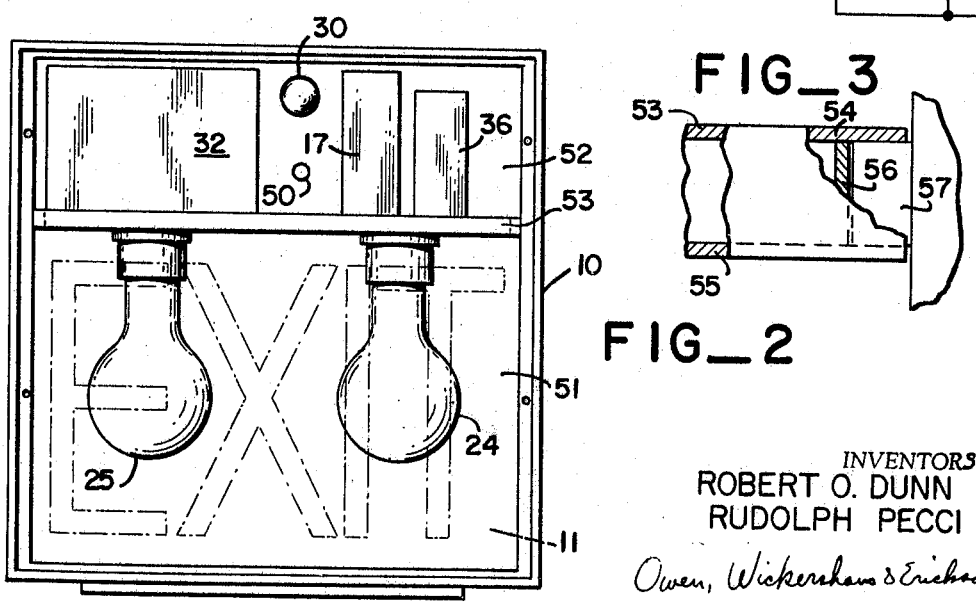
INVENTORS
ROBERT O. DUNN
RUDOLPH PECCI
Owen, Wickersham & Erickson
ATTORNEYS 3,486,068
EMERGENCY LIGHTING SYSTEM EMPLOYING DUAL FILAMENT LAMPS AND CHANGEOVER RELAYS
Robert O. Dunn, 80 Pine Hill Drive, El Sobrante, Calif. 94803, and Rudolph Pecci, 324 S. 49th St., Richmond, Calif. 94804
Continuation of application Ser. No. 654,602, July 19, 1967. This application Mar. 3, 1969, Ser. No. 805,112
Int. Cl. H05b 39/10
U.S. Cl. 315—87       14 Claims

ABSTRACT OF THE DISCLOSURE

The emergency exit unit has its housing divided by a partition into a smaller upper portion and a larger lower portion having a bottom wall, with a pair of lenses therein, for providing down-lighting. A translucent panel forms at least one wall of the lower portion, and electric lamps are supported in the lower portion by the partition. Leads connect the unit to a main power supply, such as a standard A-C public supply, and a transformer in the upper portion has a primary connected to the main power supply and at least one secondary connected to the lamps for normal lighting thereof. A rechargeable battery in the upper portion provides stand-by power if the main power supply fails, being put in service by changeover means, comprising: (1) a first relay coil having a normally closed switch and connected to the transformer secondary, so that it is energized while the main power supply is on, thereby holding its switch open, (2) a diode connected between the secondary and the contact from which the switch is opened, (3) a capacitor connected between the diode and a return to the secondary, so that capacitor is normally charged, and (4) a second relay having a pair of normally open switches, its coil being connected to the switch of the first relay, one of the switches of the second relay connecting (when it is closed) this coil to the battery, the other switch connecting (when it is closed) the battery to the lamps, so that when the first relay is de-energized, the second relay is energized momentarily by the discharge of the condenser and the battery is then locked in to maintain the lamps lighted. The unit may have a battery recharger operated by the main power supply through the transformer when the latter is energized.

---

This application is a continuation of application Ser. No. 654,602, filed July 19, 1967 now abandoned.

This invention relates to emergency exit lights. More particularly, the invention relates to an improved emergency light or sign with a self-contained auxiliary power source for operating the light or sign when the normal power supply fails.

The exit lights required in theaters and auditoriums are normally lighted by the public power supply. However, some of the conditions which give rise to emergencies or are caused by them, cut off this power supply at the time when the lights are most needed. As a result, many governmental units have promulgated fire and safety regulations requiring that emergency lighting and signs, including exit signs, have auxiliary power available at all times to operate them in the absence of their conventional power supply. However, currently available auxiliary power sources have been bulky, have been expensive to install, and have been expensive to maintain in good working order. Many of the attempts to meet these requirements have proved either unsuccessful or so expensive that authorities have sometimes winked at their own regulations and have allowed people to get by with less than what the law requires. In other instances, a severe financial burden has been placed upon those complying with the requirements, and with none too satisfactory operation either.

The present invention is addressed to the solution of this problem by a compact and relatively low-cost device providing an inexpensive, easily maintained auxiliary power source with automatic switching from the normal power supply to the auxiliary power supply. An important feature of the invention is that the entire combination of exit sign, exit lights, and auxiliary power supply is very little larger than standard exit signs having only the normal power supply. Another feature of the invention is that the device consumes an insignificant amount of power in keeping the auxiliary power supply in working order.

Other objects and advantages of the invention will become apparent from the following description of a preferred form thereof.

In the drawings:

FIG. 1 is a fragmentary view in perspective of an exit door having an exit unit embodying the principles of this invention mounted thereabove, including both an exit sign and emergency lighting shining down on the floor, as well as the auxiliary power supply and switching circuits.

FIG. 2 is a view in elevation of the exit unit of FIG. 1 with the exit glass panel shown only in phantom in order to disclose what is behind the front cover.

FIG. 3 is an enlarged fragmentary view in elevation of a portion of the device of FIG. 2, with some portions cut away and shown in section.

FIG. 4 is an electrical circuit diagram for the sign of FIGS. 1 through 3.

The invention comprises a housing 10 with a translucent panel 11 on at least one side and lenses 12 and 13 in a bottom wall 14 for down-lighting. Each translucent exit panel 11 may be replaced with other panels for emergency signs of other kinds or translucent panels for illumination, and there may be minor modifications, the sign or light may be either surface, pendant, or end mounted.

Under normal conditions the sign is lighted from house current coming in through lines 15 and 16, shown in FIG. 4, to the primary 17 of transformer 18. From a secondary 20, a lead 21 goes to filaments 22 and 23 of lamps 24 and 25, returning through leads 26, 27, and 28. Double filament lamps 24 and 25 are preferred, though not essential.

In parallel across the primary 17, is a power indicating light 30 which illuminates a dim panel 31 when the normal power supply is on. If the lights 24 and 25 go out and the light 30 is still on, the trouble is not with the power supply but with the internal circuit.

The auxiliary power supply is preferably a rechargeable battery 32, such as a nickel-cadmium battery. Normally it is kept in stand-by conditions and is not used but is kept charged by a battery charging circuit, comprising a second secondary 33 of the transformer 18, a battery charger 34 and return line 35. No power is drawn from the battery 32 except when the main power supply fails or is cut off from the transformer 18; then a changeover circuit 36 puts the battery 32 into the lamp circuit.

The changeover circuit 36 includes a transfer relay 37 provided with a switch 38, the relay's coil being placed against the secondary 20 of the transformer 18 by leads 39 and 28. The switch 38 is closed when the relay 37 is de-energized and is open when the relay 37 is energized; the relay 37 is energized so long as the house power is on; so the switch 38 is usually open. Failure of house current de-energizes the transfer relay 37 and causes its switch 38 to close against its contact 40. A lead 41 connects the contact 40 to the lead 39 through a diode 42, and a capacitor 43 is connected between the diode 42 and lead 28. When the switch 38 is closed (i.e., the relay 37 is energized), the diode 42 is connected to a second or voltage relay 44, which is normally de-energized because the switch 38 is usually open. This relay 44 has two switches 45 and 46, both of which are normally open. The switch 46 is in series with the other filaments 47 and 48 of the lamps 24 and 25, while the switch 45 is in series with the battery 32.

Power failure may be simulated, for test purposes, by a button switch 50 that, when pressed, opens the power line 15.

During normal operation the lamps 24 and 25 are lighted by the house current coming through the two conductors 15 and 16 and the closed test switch 50, operating through the transformer 18 to energize the relay 37, holding the switch 38 open, charging the capacitor 43 through the diode 42, energizing the lamp filaments 22 and 23 and then passing back to the transformer. At this time, of course the battery charger 34 is also energized, bringing the battery 32 to full voltage and maintaining the battery 32 in charged condition. When the device is drawing from house power, the power indicating light 30 and the panel 31 are also illuminated.

Upon failure of the house current, the transfer relay coil 37 is de-energized, closing the switch 38. This causes the capacitor 43 to discharge. The diode 42 blocks the discharge; so the discharge energizes the voltage relay coil 44, thereby closing the switches 45 and 46. Closure of the switch 45 locks the voltage relay coil 44 to the battery current and keeps the switch 46 closed, thereby keeping the battery 32 in circuit with the filaments 47 and 48 and lighting the lamps 24 and 25. The coil 44 is preferably so selected as to have a minimum voltage requirement equal to some predetermined percentage of the full voltage of the battery 32, and when the battery 32 drops in voltage below this predetermined percentage, the voltage relay coil 44 is de-energized, opening the two contacts 45 and 46 and cutting the power to the lamps 24 and 25. In this manner the battery 32 is protected from undue drain and possible damage.

Upon renewal of the house current, the switch 38 is opened, and house current once again becomes the sole power source for the lamps 24 and 25.

As shown in FIG. 2, only the lamps 24 and 25 extend down into the lower part 51 of the housing 10 where the sign 11 is, and all the circuit elements are above the sign 11 in a smaller upper portion 52 of the housing 10. This small upper portion 52 of the housing 10 adds little to the size of the device but a great deal to its operation. The wiring between the lamps 24, 25 and the upper portion 52 is preferably contained in a hollow partition 53 (see FIG. 3) which is replaceable to give different circuit arrangements when desirable. Moreover, this partition 53 is held in place by having a construction such as that shown in FIG. 3 wherein its main walls 54 and 55 project beyond its end walls 56 and go on each side of a block 57 secured to the housing 10. Thus, this partition 53 and the lights 24 and 25 which it supports are easily withdrawn and may be replaced. The system may provide for the lamps 24 and 25 to extend out from the side, when that is desirable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. An emergency exit unit, including in combination:
   a housing divided by a partition into a smaller upper portion and a larger lower portion having a bottom wall,
   a pair of lenses in said bottom wall for providing downlighting,
   a translucent panel forming at least one wall of said lower portion,
   electric lamps in said lower portion supported by said partition,
   leads connecting said unit to a main power supply,
   a rechargeable battery in said upper portion, for stand-by power in event of failure of said main power supply,
   a transformer in said upper portion having a primary connected to said main power supply and at least one secondary connected to said lamps for normal lighting thereof, and
   changeover means in said upper portion comprising
   a first relay coil having a normally closed switch movable against and away from a contact, said coil being connected to said secondary to energize said coil while the main power supply is energizing said transformer, and thereby to hold said switch open and away from said contact,
   a diode connected between said secondary and said contact,
   a capacitor connected between said diode and said contact on the one hand and, on the other hand, a return to said secondary, so that said capacitor is normally charged, and
   a second relay having a pair of normally open switches and a coil that is connected to the switch of said first relay, one of the switches of said second relay connecting, when it is closed, said battery to said coil of said second relay and the other one connecting, when it is closed, said battery to said lamps, so that when said first relay is de-energized, said second relay is energized momentarily by the discharge of said condenser and said battery is then locked in to maintain the lamps lighted.

2. The unit of claim 1 wherein said unit has a battery recharger operated by said main power supply through said transformer when the latter is energized.

3. The unit of claim 1 having a lamp in parallel with the primary of the transformer to indicate when the main power supply is supplying power to the transformer.

4. The unit of claim 1 wherein one lead of the main power supply has a button switch that can open the main power supply to test the changeover means.

5. In an emergency light unit having electric lamps normally lighted by a main power supply, the combination of:
   a rechargeable battery for stand-by power in the event of failure of said main power supply.
   a transformer having a primary connected to said main power supply and at least one secondary connected to said lamps for normal lighting thereof, and
   changeover means, comprising
   a first relay coil having a normally closed switch movable against and away from a contact, said coil being connected to said secondary to energize said coil while the main power supply is energizing said transformer, and thereby to hold said switch open and away from said contact,
   a diode connected between said secondary and said contact,
   a capacitor connected between (a) said diode and said contact and (b) a return to said secondary, so that said capacitor is normally charged, and
   a second relay having a pair of normally open switches and a coil that is connected to the switch of said first relay, one of the switches of said second relay connecting, when it is closed, said battery to said coil of said second relay and the other one connecting, when it is closed, said battery to said lamps, so that when said first relay is de-energized, said second relay is energized momentarily by the discharge of said condenser and said battery is then locked in to maintain the lamps lighted.

6. The unit of claim 5 having a battery recharger operated by said main power supply through said transformer when the latter is energized.

7. The unit of claim 5 wherein said second relay has a minimum voltage requirement such that when the voltage of said battery drops below that requirement, the relay is deenergized and drain on the battery prevented.

8. The unit of claim 5 having a lamp in parallel with the primary of the transformer to indicate when the main power supply is supplying power to the transformer.

9. In an emergency exit unit having electric lamps normally lighted by a main power supply, the combination of
   a rechargeable battery for stand-by power in event of failure of said main power supply,
   a transformer in said upper portion having a primary connected to said main power supply and at least one secondary connected to said lamps for normal lighting thereof, and
   changeover means in said upper portion comprising
   a switch normally closed against a contact,
   rectifier means connected between said secondary and said contact,
   a capacitor having one side connected to said dode and said contact and a second side connected to a return to said secondary, so that said capacitor is normally charged,
   means to open said switch when said main power is on, and
   means energized by discharge of said condenser when said main power supply goes off for connecting said battery to said lamps.

10. The unit of claim 9 having a battery recharger operated by said main power supply when it is on.

11. A changeover device for an emergency exit unit having lamps normally operated by a main power supply and having a stand-by battery, including in combination:
    a switch normally closed against a contact,
    means for holding said switch open while the main power supply is on,
    means for creating and storing an electric charge in connection with said contact as long as said switch is open, and
    self-holding means energized by discharge of said charge through said switch open closure of said switch, said self-holding means then connecting said battery to said lamps.

12. The unit of claim 11 wherein said unit has a battery recharger operated by said main power supply when it is on.

13. A changeover device for an emergency exit unit having lamps normally operated by a main power supply and having a stand-by battery, including in combination:
    normally closed switch means,
    means for holding said switch means open while the main power supply is on,
    means for creating and storing an electric charge in connection with said switch means as long as said switch means is open, and
    self-holding means energized by discharge of said charge through said switch means upon closure of said switch means, said self-holding means then connecting said battery to said lamps.

14. The unit of claim 13 wherein said unit has a battery recharger operated by said main power supply when it is on.

References Cited

UNITED STATES PATENTS

| | | | |
|---|---|---|---|
| 1,738,206 | 12/1929 | Riddles | 315—87 |
| 1,753,101 | 4/1930 | Whittingham | 315—87 |
| 1,946,570 | 2/1934 | Biedler | 315—87 X |
| 2,067,653 | 1/1937 | Witmer et al. | 315—86 |
| 2,476,517 | 7/1949 | Titus | 315—87 |
| 2,759,130 | 8/1956 | Brewer | 317—154 X |
| 3,083,317 | 3/1963 | Fish et al. | 315—87 |

OTHER REFERENCES

"Single Relay Binary X Trigger," by P. Abramson et al., IBM Technical Disclosure Bulletin, vol. 6, No. 1, June 1963.

JAMES W. LAWRENCE, Primary Examiner

C. R. CAMPBELL, Assistant Examiner

U.S. Cl. X.R.

315—86, 88; 317—151, 154